No. 894,768. PATENTED JULY 28, 1908.
F. N. WONDERLIN.
CAR SWITCHING.
APPLICATION FILED DEC. 20, 1906.

2 SHEETS—SHEET 1.

Witnesses.
Inventor.

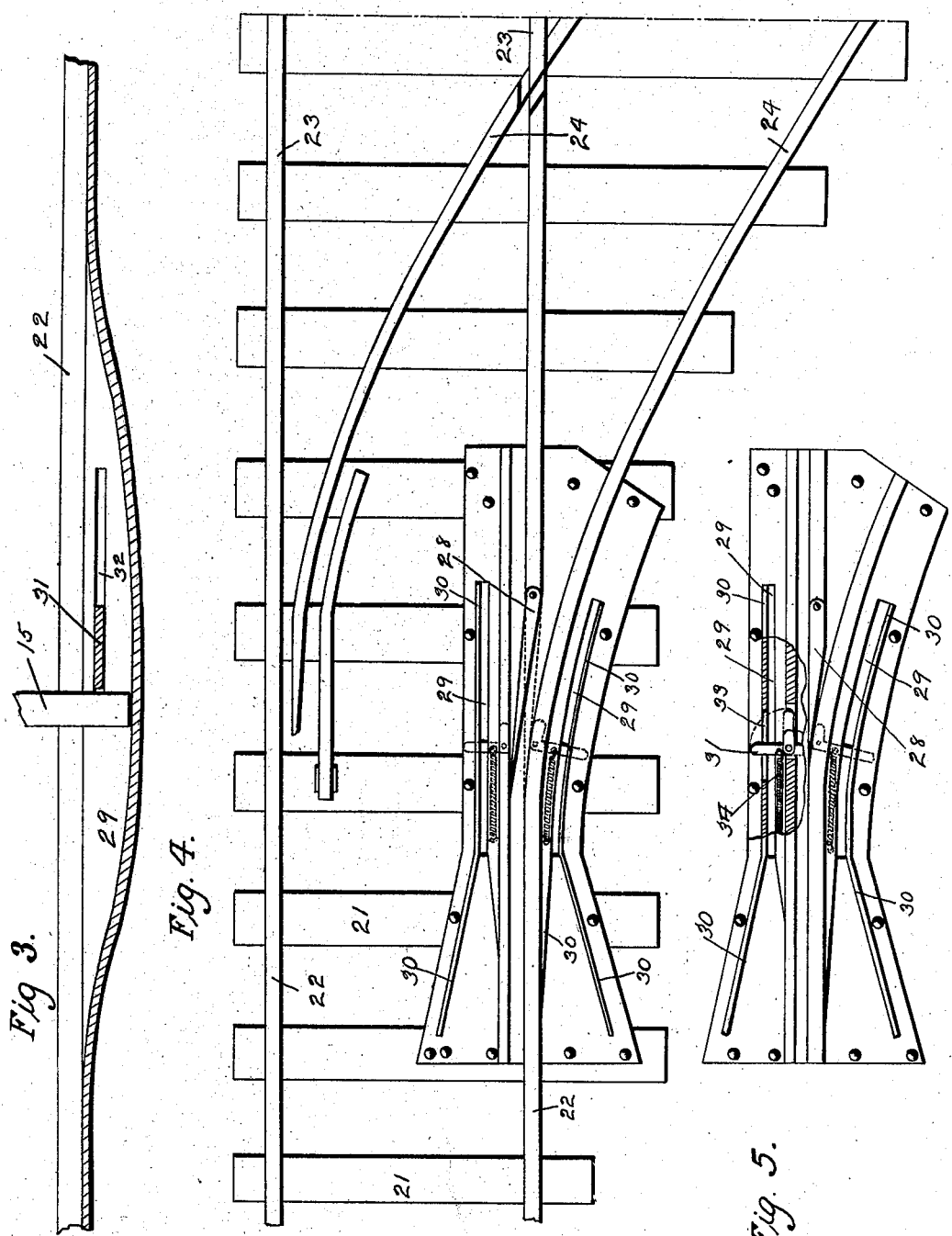

UNITED STATES PATENT OFFICE.

FREDERICK N. WONDERLIN, OF DES MOINES, IOWA.

CAR-SWITCHING.

No. 894,768. Specification of Letters Patent. Patented July 28, 1908.

Application filed December 20, 1906. Serial No. 348,705.

*To all whom it may concern:*

Be it known that I, FREDERICK N. WONDERLIN, a citizen of the United States, residing at Des Moines, in the county of Polk and State of Iowa, have invented certain new and useful Improvements in Car-Switching, of which the following is a specification.

The object of my invention is to provide certain new and useful improvements in car switching especially adapted for use in connection with street cars, whereby the operator may, by depressing a foot lever, cause an arm carried by the car to engage a bell-crank lever in the switch frog, which bell-crank lever will automatically force the movable switch point to the desired position for directing the car to either of two branches of the track.

A further object is to provide an improved switch frog containing the bell-crank levers for operating the switch point and so arranged that the arms carried by the cars will be guided to the proper places in the switch frog for operating the bell-crank levers and at the same time a switch frog will be provided over which vehicles may safely travel in all directions without interfering with the mechanism therein contained.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1:
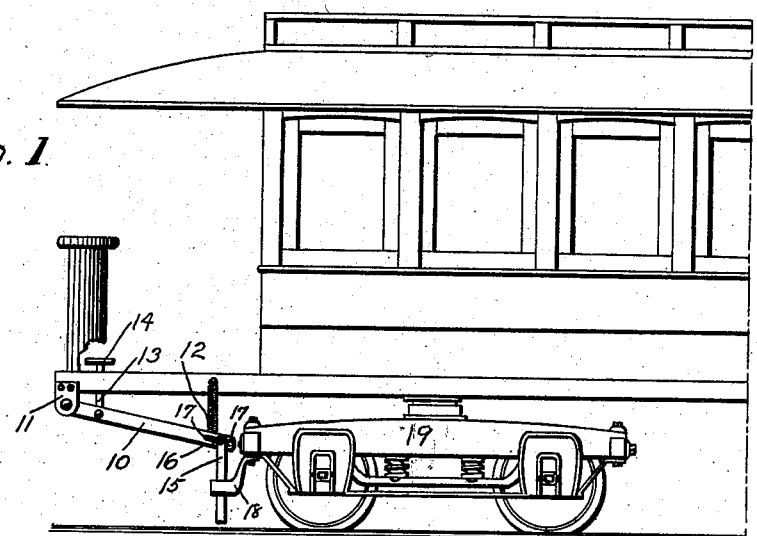
Figure 2:
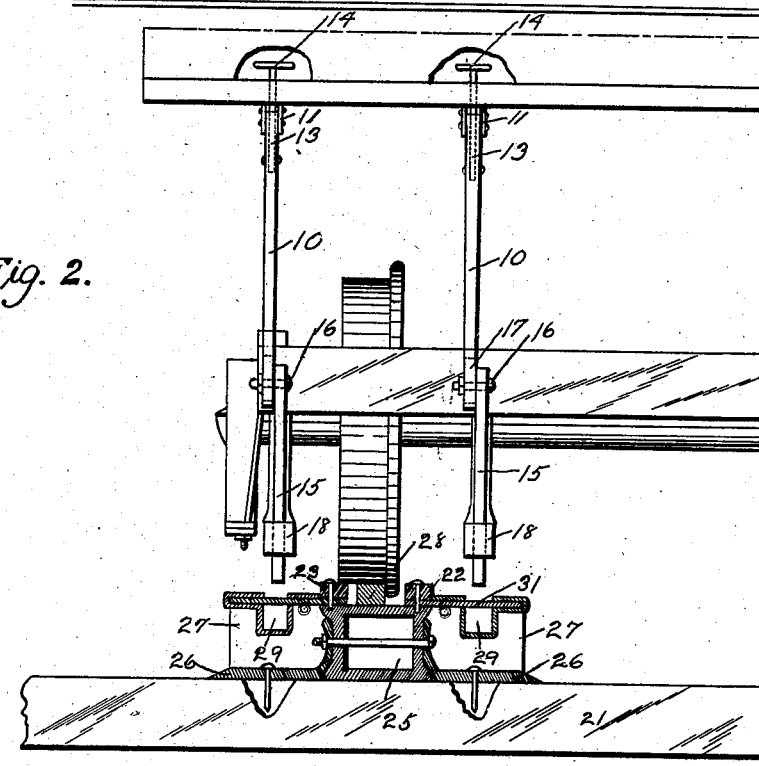

Figure 1 shows a side elevation of a portion of a street car provided with my improved switch operating devices. Fig. 2 shows an enlarged sectional transverse view illustrating a section of a car provided with my improvements and a switch plug provided with my improvements beneath the car and on the railway tie. Fig. 3 shows an enlarged detail view in vertical section of a portion of the switch frog to illustrate the shape of the cavity in which the bell crank lever is contained. In this view one of the arms carried by a car is shown in position in engagement with the bell-crank lever. Fig. 4 shows a plan view of a railway truck having a branch therein with my improved switch frog in position, and Fig. 5 shows a plan view of my improved switch frog detached, with a part of the upper plate broken away to show the interior construction.

Referring to the accompanying drawings, I shall first describe the operating mechanism carried by the car. This mechanism consists of two independent switch operating devices, each comprising a lever 10 fulcrumed at its forward end to a bracket 11 on the car and extended rearwardly and downwardly. At its rear lower end is a contractible coil spring 12 fixed to the lever and to the car, to normally hold the lever elevated. Pivoted between the ends of the lever 10 is an upright shaft 13 having a treadle 14 at its upper end projected above the floor of the car. At the rear end of the lever 10 is a switch operating arm 15 having a sliding connection with the lever 10. This sliding connection is made by having the bolt 16 extended through the arm 15 and through a slot 17 in the lever 10. The lower portion of the arm 15 is supported and guided by a bracket 18 fixed to the car truck 19. The sliding connection between the lever 10 and the arm 15 is made necessary on account of the lateral movement of the truck relative to the car platform.

The reference numeral 21 is used to indicate the cross ties and 22 the rails of a main track. Two branch tracks 23 and 24 connect with the main track 22 in the ordinary manner.

The switch frog comprises a hollow base portion 25 having brace plates 26 connected therewith and spiked to the cross ties. Webs 27 project outwardly from said base 25 and support the top plate of the switch frog. Extensions of the various rails extend across the surface of the top plate and movable switch point 28 is provided. The arrangement of these rail extensions and the switch point is the same as is now in common use and a detail description thereof is deemed unnecessary. At about the central portion of the top plate of the switch frog on each side of the movable switch point is a chamber 29 extending longitudinally of the switch frog and at one end of said chamber 29, I have provided two guide ribs 30 converging at the adjacent end of said chamber and projected above the surface of top plate for the purpose of guiding the arms 15 into said chamber. The opening at the top of the chamber 19 is made so narrow that vehicle wheels cannot enter it, but the arms 15 are of such thickness that they will readily enter said chamber.

There is a similar switch point operating device on each side of the switch point.

These devices, each comprise a bell-crank lever 31 pivoted beneath the adjacent rail member. One end of the bell-crank lever normally lies in a slot 32 under the rail extension and the other end normally projects at right angles through the chamber 29 and into a slot 33 in the top plate. A contractible coil spring 34 is attached to each bell-crank lever and to a part of the switch frog to normally hold the bell-crank lever in the above described position. When said bell-crank lever is moved a quarter revolution against the spring pressure, one end will project beyond the rail member and engage the movable switch point and throw it to its limit of movement away from the bell-crank lever and as soon as the bell-crank lever is released, its spring 34 will return it to its normal position.

In practical use and assuming the bell-crank levers to be in the positions shown in Fig. 4 and assuming further that it is desired to direct a car approaching the branch to the right track at the branch, then the operator on the car places his foot upon the treadle 14 on the right side just as he approaches the switch frog. The guide ribs 30 on the top plate of the switch frog will direct the arm 15 into the chamber 29. This chamber is made of such depth that the ordinary up and down movements of the car will not prevent the arm 15 from striking the outwardly projecting portion of the bell-crank lever. When the car arm 15 strikes said lever, it will immediately force the switch point to the left, as shown by solid lines in Fig. 4 and then the car will be directed to the right branch of the track. As soon as the arm 15 passes the bell-crank lever, the spring 34 will return it to normal position and hence the movable switch point will remain in the position in which it was placed so that the rear truck of the car will follow the forward one, so that it is not necessary to provide any means for setting the movable switch point for the rear truck of the car.

The chamber 29 is made so narrow that vehicle wheels will not enter it and if it should become filled with sand or other material, it will be cleaned out each time that a car passes over the switch frog where it may be readily and quickly cleaned out with a broom or the like because the bell-crank lever may be moved to position clear of the chamber so that it may be easily swept out.

Having thus described my invention, what I claim and desire to secure by Letters Patent of the United States, therefor is—

1. In a device of the class described, the combination of a switch frog having branched track members thereon, said frog having a longitudinal depressed chamber formed on each side of the track member, a movable switch point, levers fulcrumed in the switch frog below its top surface and designed to engage the movable switch point, said levers being also projected across said chambers, springs for normally holding the levers away from the switch point, and diverging guide ribs at one end of each of said chambers.

2. An improvement in car switching, comprising a main track, a branch track connected therewith, a switch frog having branched rail members thereon, a movable switch point pivoted to the switch frog, a longitudinal chamber on each side of the frog, two bell-crank levers fulcrumed under the rail members on opposite sides of the movable switch point and projecting across the chambers in the switch frog, springs for normally holding said levers out of engagement with the movable switch point and divergent guide ribs at one end of each of said chambers.

3. An improvement in car switching, comprising a main track, a branch track connected therewith, a switch frog having branched rail members thereon, a movable switch point pivoted to the switch frog, a longitudinal chamber on each side of the frog, two bell-crank levers, fulcrumed under the rail members on opposite sides of the movable switch point and projecting across the chambers in the switch frog, springs for normally holding said levers out of engagement with the movable switch point, divergent guide ribs at one end of each of said chambers, a car, a lever fulcrumed at its forward end to the car and extended rearwardly, a bracket fixed to the car truck, an arm slidingly mounted in said bracket and slidingly and pivotally connected with said lever, a spring for elevating the rear end of said lever and a foot lever for depressing it.

Des Moines, Iowa, November 10, 1906.

FREDERICK N. WONDERLIN.

Witnesses:
J. RALPH ORWIG,
S. F. CHRISTY.